United States Patent [19]
Becerra

[11] Patent Number: 6,046,554
[45] Date of Patent: Apr. 4, 2000

[54] METHOD AND APPARATUS FOR CALIBRATING A PERMANENT-MAGNET MOTOR USING BACK EMF MEASUREMENT

[75] Inventor: Roger C. Becerra, Fort Wayne, Ind.

[73] Assignee: General Electric Company, Schenectady, N.Y.

[21] Appl. No.: 09/023,725

[22] Filed: Feb. 13, 1998

[51] Int. Cl.[7] .................................................. H02K 29/00
[52] U.S. Cl. ........................ 318/254; 318/434; 318/721; 318/439; 318/138; 388/806
[58] Field of Search ................... 318/254, 138, 318/139, 439, 628, 696, 432, 805, 434, 721; 388/911, 806

[56] References Cited

U.S. PATENT DOCUMENTS

| | | | |
|---|---|---|---|
| 4,275,343 | 6/1981 | Fulton et al. | 318/721 |
| 4,484,128 | 11/1984 | Jotten et al. | 318/805 |
| 4,651,067 | 3/1987 | Ito et al. | 318/254 |
| 4,868,477 | 9/1989 | Anderson et al. | 318/696 |
| 4,928,043 | 5/1990 | Plunkett | 318/254 |
| 5,075,608 | 12/1991 | Erdman et al. | 318/599 |
| 5,113,125 | 5/1992 | Stacey | 318/721 |
| 5,223,775 | 6/1993 | Mongeau | 318/432 |
| 5,444,341 | 8/1995 | Kneifel, II et al. | 318/432 |
| 5,451,846 | 9/1995 | Peterson et al. | 318/254 |
| 5,592,058 | 1/1997 | Archer et al. | 318/254 |
| 5,629,598 | 5/1997 | Wilkerson | 318/808 |
| 5,631,999 | 5/1997 | Dinsmore | 388/805 |
| 5,633,568 | 5/1997 | Dunfield | 318/254 |
| 5,654,840 | 8/1997 | Patton et al. | 360/75 |

FOREIGN PATENT DOCUMENTS 55-79694 of 0000 Japan.

*Primary Examiner*—Paul Ip
*Assistant Examiner*—Rita Leykin
*Attorney, Agent, or Firm*—Welsh & Katz, Ltd.; Damian G. Wasserbauer; Carl B. Horton

[57] ABSTRACT

A motor which has a first motor winding that provides a motor back EMF during operation of the motor, and which is operable by a supply current to develop, at a predetermined nominal rotational speed, a predetermined nominal torque corresponding to a predetermined operating current and a predetermined nominal back EMF, is calibrated by applying a supply current to the motor such that the motor operates at a known rotational speed, disconnecting the supply current from the motor such that the motor decelerates from the known rotational speed, and obtaining an EMF indication of motor back EMF. The EMF indication is compared with the predetermined nominal back EMF, and a supply current adjustment that provides for compensation of the supply current based on the EMF indication and the predetermined nominal back EMF is developed, such that the motor produces the predetermined nominal amount of torque when operated at the predetermined nominal rotational speed. The supply current adjustment is stored so that the motor can subsequently be operated with the supply current and the stored supply current adjustment.

24 Claims, 3 Drawing Sheets

METHOD AND APPARATUS FOR CALIBRATING A PERMANENT-MAGNET MOTOR USING BACK EMF MEASUREMENT

FIELD OF THE INVENTION

The present invention relates generally to calibration of permanent-magnet motors and, more particularly, to a method and apparatus for calibrating a permanent-magnet motor using a back EMF measurement to develop an adjustment to the supply current operating the motor.

BACKGROUND OF THE INVENTION

Electronically controlled motors (ECM's), are commonly used, for example, in high-efficiency furnaces, air-conditioner blowers, and other airflow regulation applications requiring torque to be provided with a high degree of accuracy. As is well-known, the torque generated by a motor is the product of the current flowing in the primary winding of the motor and the back EMF provided by the motor. However, such motors are often driven by an inverter-switch motor drive, and motor torque can also be affected by the commutation angle and the conduction interval of the inverter switches of the motor drive. Nevertheless, because motor winding current can be accurately controlled to within a relatively small tolerance, and because the effect of the motor drive parameters on torque is substantially constant among motors operating at a given nominal speed, the dominant factor affecting torque output among similar motors is variance in the back EMF provided by each one.

The back EMF of a motor, in turn, depends on the magnetic strength of the permanent magnet used by the motor to create motive power. As will be appreciated by those of ordinary skill in the art, variations in magnet strength from one motor to another are inevitable due to inherent, slight differences in physical properties of the magnetic materials used for each motor, even among motors produced by the same manufacturing process. Further variations in magnet strength among motors can also be brought about by differences in ambient operating conditions (e.g., operating temperature) among otherwise identical motors.

To compensate for such variations in magnetic material strength among electronically controlled motors used for any particular application, each such motor must be independently calibrated to achieve a predetermined nominal level of output torque at a predetermined nominal operating speed. The nominal values for these parameters are often precisely specified for particular ECM applications.

Previously, calibration of an ECM has required the use of a closed-loop calibration station or dynamometer to measure the amount of torque produced by the ECM and raise or lower the supply current provided to the motor to maintain a desired torque level. This method of calibration via a dynamometer must be performed manually by an operator and is generally costly and time-intensive. Moreover, the dynamometer is a mechanical apparatus that is subject to wear and requires periodic maintenance which adds further to the time and expense associated with motor calibration by prior-art methods.

SUMMARY OF THE INVENTION

The present invention provides a method by which permanent magnet motors can be calibrated automatically and without employing a dynamometer. According to one aspect of the present invention, a method is provided for calibrating a motor having a first motor winding that provides a motor back EMF during operation of the motor. That motor generally is one that is operable by a supply current to develop, at a predetermined nominal rotational speed, a predetermined nominal torque corresponding to a predetermined operating current and a predetermined nominal back EMF. In accordance with the method, a supply current is applied to the motor such that the motor operates at a known rotational speed. The supply current is then disconnected from the motor such that the motor decelerates from the known rotational speed, and an EMF indication of the magnitude of the motor back EMF is obtained. The EMF indication is compared with the predetermined nominal back EMF, and a supply current adjustment providing for compensation of the supply current, such that the motor produces the predetermined nominal amount of torque when operated at the predetermined nominal rotational speed, is developed based on the EMF indication and the predetermined nominal back EMF. The developed supply current adjustment is stored for use in operating the motor.

In one variant of the method, motor back EMF is sensed via the first motor winding while the motor is decelerating and after the operating current has decayed substantially to zero.

In another variant, the motor to be calibrated has a second motor winding magnetically coupled with the first winding, and the motor back EMF is obtained by sensing motor back EMF via the second motor winding. The second motor winding is preferably a quadrature winding with respect to the first motor winding and provides a scalar multiple of the motor back EMF provided by the first motor winding, and the motor back EMF is preferably sensed while the motor is powered and operating.

The supply current adjustment developed by the method of the present invention may represent an increase to the supply current if the EMF indication is less than the predetermined nominal back EMF and a decrease to the supply current if the EMF indication exceeds the predetermined nominal back EMF.

In yet another variant of the method of the present invention, calibration is performed on a motor having a primary winding that provides a motor back EMF during operation of the motor and a secondary winding that provides a scalar multiple of the motor back EMF during operation of the motor. The motor is again operable by a supply current to develop, at a predetermined rotational speed, a predetermined nominal torque corresponding to a predetermined operating current and a predetermined nominal back EMF. In this variant of the calibration method, the motor is operated at a known rotational speed, and an EMF indication of the motor back EMF is obtained via the secondary winding while the motor is operating at the known rotational speed. This EMF indication is compared with the predetermined nominal back EMF, and a supply current adjustment providing for compensation of the supply current is developed based on the EMF indication and the predetermined nominal back EMF, such that the motor produces the predetermined nominal amount of torque when operated at the predetermined nominal rotational speed. The developed supply current adjustment is then stored for use in operating the motor.

The present invention may also be embodied in an apparatus for calibrating a motor having a first motor winding that provides a motor back EMF during operation of the motor, wherein the motor is operable by a supply current to develop, at a predetermined nominal rotational speed, a predetermined nominal torque corresponding to a predetermined operating current and a predetermined nominal back EMF. Such an apparatus comprises a source of supply current, an EMF sensing circuit for obtaining an EMF indication of motor back EMF, and a comparator for comparing the EMF indication with the predetermined nominal back EMF. In operation, the source of supply current is connectable to the motor such that the motor operates at a known rotational speed and also is disconnectable from the motor such that the motor decelerates from the known rotational speed. The apparatus also includes a circuit or other developing means for developing a supply current adjustment providing for compensation of the supply current based on the EMF indication and the predetermined nominal back EMF such that the motor produces the predetermined nominal amount of torque when operated at the predetermined nominal rotational speed, and a memory for storing the supply current adjustment.

In one embodiment of the apparatus, the EMF sensing circuit senses motor back EMF via the first motor winding. In another embodiment, the motor has a second motor winding magnetically coupled with the first winding and the EMF sensing circuit senses motor back EMF via the second motor winding. In this latter embodiment, the second motor winding preferably is a quadrature winding with respect to the first motor winding and provides a scalar multiple of the motor back EMF provided by the first motor winding, and the EMF sensing circuit preferably senses motor back EMF while the motor is powered and operating. The supply current adjustment developed by the developing means represents an increase to the supply current if the EMF indication is less than the predetermined nominal back EMF and represents a decrease to the supply current if the EMF indication exceeds the predetermined nominal back EMF.

Another embodiment of the apparatus of the present invention calibrates a motor having a primary motor winding that provides a motor back EMF during operation of the motor and a secondary winding that provides a scalar multiple of the motor back EMF during operation of the motor, wherein the motor is operable by a supply current to develop, at a predetermined nominal rotational speed, a predetermined nominal torque corresponding to a predetermined operating current and a predetermined nominal back EMF. This embodiment of the apparatus comprises means for operating the motor at a known rotational speed, an EMF sensing circuit for obtaining an EMF indication of the magnitude of the motor back EMF via the secondary motor winding while the motor is operating at the known rotational speed, and a comparator for comparing the EMF indication with the predetermined nominal back EMF. The apparatus also includes means for developing a supply current adjustment providing for compensation of the supply current based on the EMF indication and the predetermined nominal back EMF such that the motor produces the predetermined nominal amount of torque when operated at the predetermined nominal rotational speed, and a memory for storing the supply current adjustment.

DETAILED DESCRIPTION OF THE INVENTION

Figure 1:
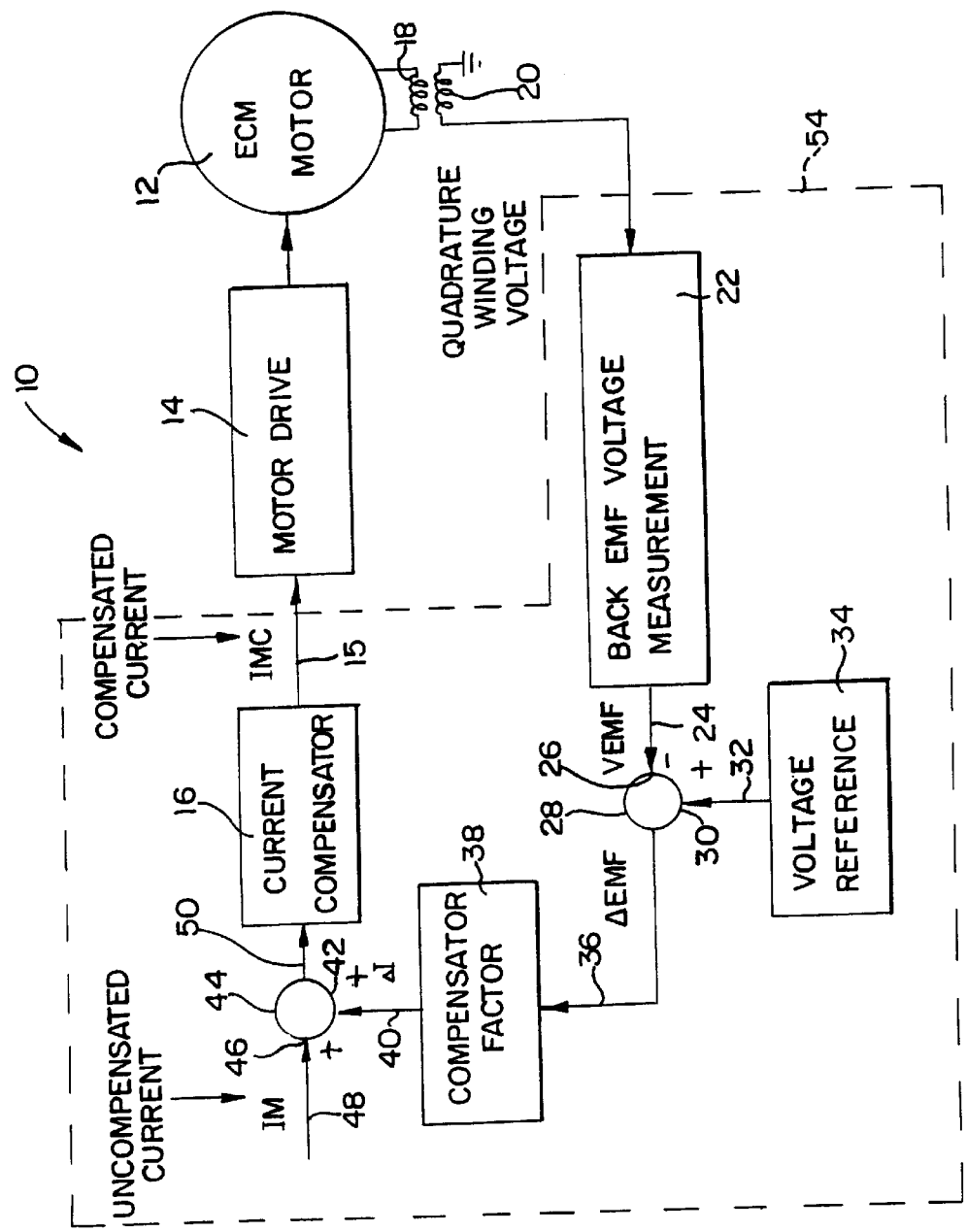
FIG. 1 is a block diagram of a calibration system for implementing the method of the present invention.

FIG. 1 depicts a block diagram of a system 10 for calibrating an electronically controlled motor or ECM 12, in accordance with the method of the present invention, to produce a predetermined nominal amount of torque at a predetermined nominal rotational speed. As shown in FIG. 1, a motor drive 14 is provided for powering the motor 12. The motor drive 14, in turn, is controlled by a compensated current 15 received from a current compensator 16. The motor 12 has a primary motor winding 18 which provides a back EMF produced by the motor 12 and which is used by the motor 12 to produce torque. In addition, the motor 12 also has a secondary motor winding 20, which is not used to produce torque. The secondary motor winding 20 is magnetically coupled with the primary motor winding 18 and provides a scalar multiple of the back EMF provided by the primary motor winding 18. The secondary motor winding 20 may be in quadrature with, or may alternatively bear some other phase relationship to, the primary motor winding 18.

In the embodiment illustrated in FIG. 1, a back EMF voltage measurement block 22 senses the back EMF provided by the secondary motor winding 20 (i.e., the scalar multiple of the back EMF provided by the primary motor winding 18). The back EMF voltage measurement block 22 develops an EMF indication 24 of the motor back EMF, such as by integration or digitization of the motor back EMF waveform, for example, and the EMF indication 24 is output by the back EMF voltage measurement block 22 and coupled to an inverting input 26 of a summer 28. The summer 28 also has a non-inverting input 30, which receives a predetermined nominal back EMF signal 32 from a voltage reference block 34. The predetermined nominal back EMF signal 32 provided by the voltage reference block 34 is the back EMF magnitude required to for the motor 12 to produce the predetermined amount of torque at the predetermined rotational speed in the absence of the motor current compensation provided by the method of the present invention. Thus, if the absolute value of the EMF indication 24 is equal to that of the nominal back EMF signal 32, then no current compensation is required.

The summer 28 compares (or computes the difference between) the predetermined nominal back EMF signal 32 and the EMF indication 24. The summer 28 has an output 36 which provides this EMF difference to a compensator factor block 38, which develops and stores a supply current adjustment 40. The supply current adjustment 40, in turn, is provided to an input 42 of a summer 44. The summer 44 also has a second input 46 which receives an uncompensated supply current signal 48 from a current supply circuit (not shown). The summer 44 has an output 50 which provides to the current compensator 16 the sum of the uncompensated supply current signal 48 and the supply current adjustment 40. The current compensator 16, in turn, produces a compensated current signal or command 15, as indicated above, by means of whatever additional compensation may be necessary for proper operation of the particular motor drive 14 used to drive the electronically controlled motor 12. The calibration apparatus of the present invention is outlined in phantom lines (and designated by reference numeral 54) in FIG. 1.

Figure 2:
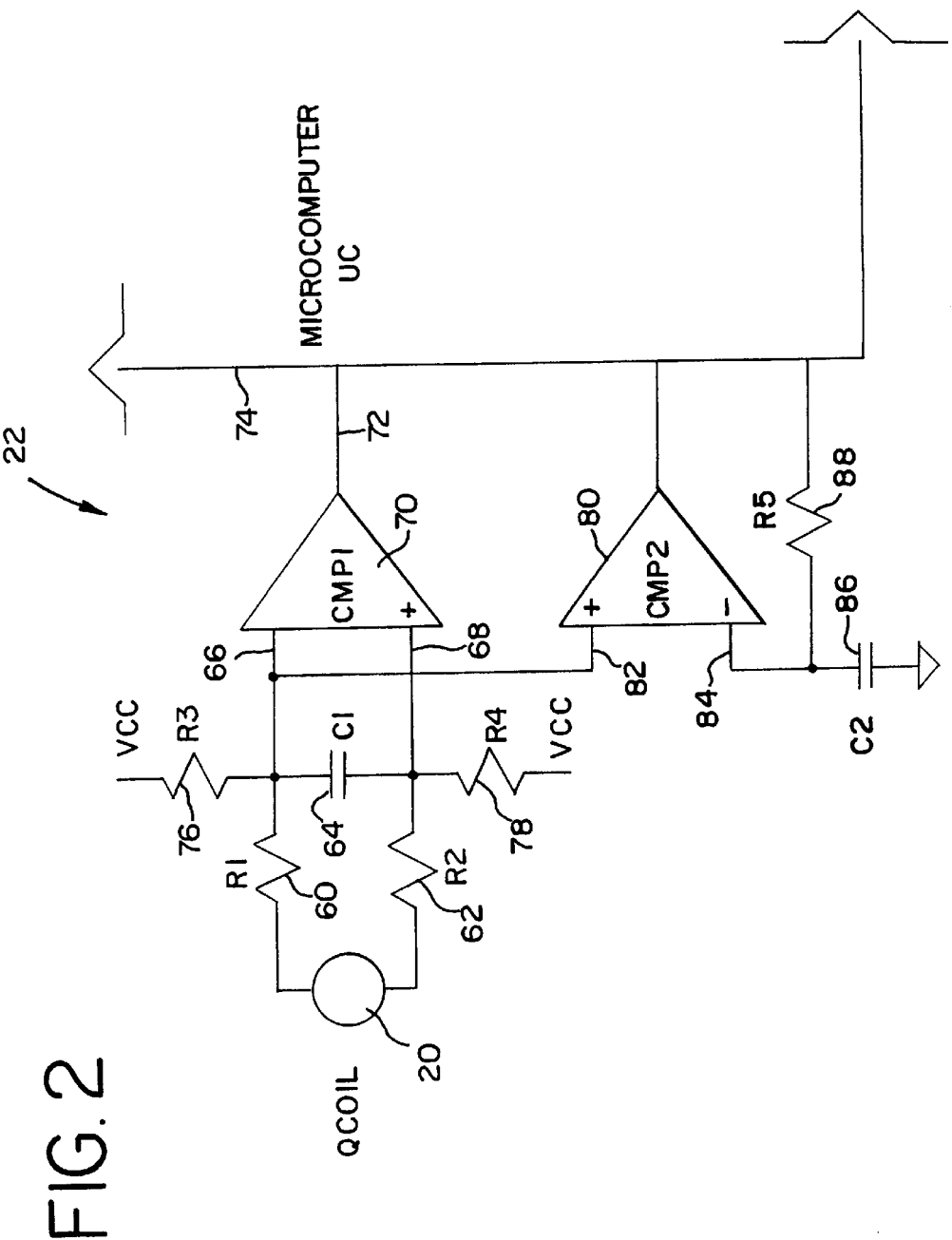
FIG. 2 is a schematic diagram of one embodiment of the motor back EMF signal processing circuit depicted in the block diagram of FIG. 1.

One embodiment of the back EMF voltage measurement block 22 of FIG. 1 is illustrated schematically in FIG. 2. As shown, resistors 60 and 62 (designated R1 and R2, respectively, in FIG. 2) are coupled in series with the secondary (optionally quadrature) coil 20 of an electronically controlled motor (such as the motor 12 of FIG. 1). The motor itself is not shown in FIG. 2. This series combination is coupled in parallel with a capacitor 64 (designated C1) which is coupled between the inverting input terminal 66 and the non-inverting input terminal 68 of an operational amplifier or comparator 70 (designated CMP1). The comparator 70 has an output 72 which is coupled to a microprocessor or microcomputer 74. A resistor 76 (designated R3) is coupled between the inverting input terminal 66 of the comparator 70 and a positive voltage source VCC. Similarly, a resistor 78 (designated R4) is coupled between the non-inverting input 68 of the comparator 70 and the voltage source VCC. The resistors R1, R2, R3, and R4 provide a bias level to avoid the need for negative control logic in addition to the positive control logic shown in the back EMF voltage measurement circuit of FIG. 2. Additionally, those resistors, together with the capacitor C1, form a low-pass filter that reduces high-frequency noise in the circuit. A second operational amplifier or comparator 80 (designated CMP2) has a non-inverting input terminal 82 coupled to the inverting input terminal 66 of the comparator 70 and an inverting input terminal 84, which is coupled through a capacitor 86 (designated C2) to ground and also through a resistor 88 (designated R5) to the microprocessor 74. By way of example, the circuit elements of the schematic of FIG. 2 can have the following values: R1=10 kΩ, R2=10 kΩ, R3=10 kΩ, R4=10 kΩ, R5=100 kΩ, C1=470 pf, and C2=0.1 μf.

As will be apparent to those of ordinary skill in the art, the comparator 70 (CMP1) indirectly supplies the microcomputer 74 with information as to the instantaneous rotor position of the motor 12 (i.e., by identifying zero-crossings of the motor back EMF waveform), and the comparator 80 (CMP2), the capacitor 86 (C2), and the resistor 88 (R5) together form a basic microcomputer-controlled analog-to-digital converter.

As indicated above, the focus of the calibration performed by the method and apparatus of the present invention is on compensating for a variance in back EMF voltage of a motor caused either by a variance in the strength of the permanent magnet employed by the motor or by other variations that may affect the magnitude of the back EMF (e.g., different number of winding turns, rotor-stator concentricity, etc.). Once again, this is so because variations in the motor current can be readily compensated for by regulating the motor current in any conventional manner. Thus, the torque produced by a motor generally depends almost entirely on the back EMF provided by the motor.

The calibration method and apparatus of the present invention is now described in detail with reference to FIGS. 1 and 2. The calibration is implemented by operating the motor 12 at a known rotational speed using a supply current and measuring the back EMF provided by the motor 12 via the secondary motor winding 20 at that speed. An EMF indication of the measured back EMF is then compared against a reference voltage corresponding to a predetermined nominal back EMF associated with the motor 12. From the difference between the EMF indication and the predetermined nominal back EMF, a supply current adjustment is developed which will compensate the supply current based on the EMF indication and the predetermined nominal back EMF. The resulting supply current adjustment is stored in a non-volatile memory (not shown) associated with the microprocessor 74 (FIG. 2).

The EMF indication is developed by measuring the magnitude of the motor back EMF. This measurement can be made by sensing the back EMF at the primary motor winding 18, but only when the supply current has been disconnected, such that the motor is decelerating, and the operating current of the motor 12 has decayed to substantially zero. Alternatively, the back EMF (or a scalar multiple thereof) can be sensed at the secondary motor winding 20, if present, which is electrically independent of, but magnetically coupled with, the primary motor winding 18. Sensing back EMF by the latter alternative method permits the back EMF to be sensed even in the presence of flux emanating from the torque-producing primary motor winding 18 because of the electrical independence of the primary and secondary windings 18 and 20. Consequently, back EMF can be sensed via the secondary winding 20 while the motor 12 is operating at a known rotational speed (i.e. during calibration).

Of course, the skilled artisan will appreciate that the back EMF voltage of the motor 12 can be measured in many conventional ways. For one example, the peak amplitude of the motor back EMF can be detected and used as the back EMF. Alternatively, a more refined measurement can be obtained by digitizing the back EMF voltage waveform, such that the shape of the overall waveform can be reflected in the back EMF measurement (e.g., by integration of the waveform). In general, the particular manner in which the back EMF of the motor 12 is measured forms no part of the present invention, and any desired back EMF measurement method can be used. However, the calibration method and apparatus of the present invention do depend on whether the motor back EMF is measured via the primary motor winding 18 or the secondary motor winding 20.

If the motor back EMF is measured from the primary motor winding 18, for example, then the measurement must be made while the motor is decelerating and the operating current is substantially zero. Typically, the motor back EMF is integrated over a pre-defined time interval or number of electrical cycles of the motor. The integrated back EMF then represents flux linkage across the air gap of the motor 12. However, an optimum resolution for the magnet strength measurement can be made by rectifying the back EMF waveform prior to the integration thereof, such that the amplitude of the back EMF waveform is constrained by the integration interval. If necessary, conventional signal conditioning may be applied to translate a high-amplitude back EMF waveform to a signal level amplitude.

Prior to measuring motor back EMF from the primary motor winding 18, the supply current 48 is first applied to the motor 12 such that the motor 12 operates at a known rotational speed. The known rotational speed can be the predetermined nominal rotational speed at which the motor is to be operated after calibration or any other desired (and known) calibration speed. The supply current 48 is then disconnected from the motor 12 such that the motor 12 decelerates from the known speed, and an EMF indication of the motor back EMF is obtained from the primary motor winding 18. Of course, the motor back EMF could alternatively be measured from a secondary motor winding 20, if the motor 12 is provided with one.

On the other hand, if the motor 12 does include a secondary motor winding 20, and back EMF is measured from that winding, the measurement can be made while the motor 12 is powered and operating at a known rotational speed rather than while the motor 12 is decelerating with substantially zero operating current. Moreover, because the secondary motor winding 20 is electrically independent of the primary motor winding 18, measuring motor back EMF via the secondary motor winding 20 has two important advantages over measuring motor back EMF via the primary motor winding 18. First, if the primary and secondary motor windings 18 and 20 are designed properly, the motor back EMF, as measured via the secondary motor winding 20, can be a scalar multiple of the back EMF provided by the primary motor winding 18 with the precise signal level amplitude required for compatibility with downstream processing circuitry. Of course, the secondary winding 20 can alternatively be designed to provide the same back EMF as the primary winding 18 (i.e., such that the scalar factor is unity), if desired. In any case, the back EMF signal provided by the secondary motor winding 20 is more noise-free than that provided by the primary motor winding 18 while the motor is powered and operating.

Calibration of a motor 12 in accordance with the method of the present invention can be performed while the motor 12 is operating with or without a load. Calibration without a load on the motor 12 is preferable because no shaft coupling is required, and the calibration can therefore be performed quickly by simply operating the motor at a known no-load rotational speed, which can be selected by setting the inverter DC link voltage to obtain an optimum back EMF voltage measurement. In other words, the speed of the motor 12 can be made dependent on the magnitude of the DC link voltage, such that the DC link voltage can be used to operate the motor 12 at a rotational speed which will optimize the digitizing resolution or accuracy of the digitizer used to determine the motor speed and thus the back EMF, as explained below. In the embodiment illustrated in FIG. 2, the microcomputer 74 performs this digitizing function based on zero-crossings of the back EMF sensed by the comparator 70.

Alternatively, the motor 12 can be self-calibrated while operating under a load (not shown). This type of calibration occurs when the motor 12 is operating in an actual application and can be implemented at a suitable constant speed (e.g., the speed of the motor 12 required for the application). The motor back EMF (or a scalar multiple thereof) is obtained from the secondary motor winding 20. If necessary, the motor back EMF can be obtained by integrating the back EMF waveform over a predefined time interval or a predefined number of electrical cycles of the motor 12 to attain, once again, the optimum signal level resolution of the digitizer.

The accuracy of the back EMF voltage measurement block 22 (FIGS. 1 and 2) is now explained in more detail and in quantitative terms. As noted above, the comparator 80, the capacitor 86, and the resistor 88 form a microcomputer-controlled analog-to-digital converter controlled by the microcomputer 74. If the analog-to-digital conversion is performed with an 8-bit resolution (i.e., $2^8-1=255$ increments), and if the secondary motor winding 20 produces a back EMF at 2 mV/rpm of the motor 12, operating at a no-load rotational speed of 2000 rpm, then the back EMF provided by the secondary motor winding 20 is 4 V (2 mV/rpm×2000 rpm), which represents the nominal back EMF for the motor 12. Allowing for signal variations of up to 12.5% above the nominal EMF, the digitizer (analog-to-digital converter) should have a maximum input voltage of at least 4.5 V. In general, this tolerance should be sufficient, because a typical production lot or batch of ferrite magnets exhibits a variation in magnet strength for a given temperature of about ±7%. The resolution of the digitizer is thus 4.5V/255 or 17.65 mV. The speed resolution of the measurement produced by the digitizer is then 17.65 mV /2 mV/rpm or 8.8 rpm, and the digitizer accuracy is 8.8 rpm/2000 rpm×100 or 0.44%. The secondary motor winding 20 on which the foregoing numerical example is based is a coil wound on a 1 hp, 12-pole, single-phase, salient-pole motor. Once again, the foregoing example assumes a motor 12 having a secondary winding 20 designed to produce a back EMF at 2 mV/rpm of the motor 12. If the secondary motor winding produced a back EMF at 1 mV/rpm of the motor 12, for example, then the digitizer accuracy would be degraded (i.e., increased) by a factor of two.

It should be noted that where the calibration method of the present invention is employed to compensate for variations in magnet strength induced by variations in the ambient operating temperature of a motor 12, the motor 12 will need to be calibrated periodically while the motor 12 is in operation to fully compensate for the thermal effects on shaft power or output torque of the motor 12. As a corollary to the ability of this compensation method and apparatus to compensate for thermal effects, the method and apparatus can also be used to estimate or infer the rotor temperature of the motor 12 at any given time, provided the rotor temperature of the motor 12 at the time of calibration is known.

Significantly, while the method and apparatus of the present invention can be applied to three-phase or multi-phase motors, it is generally more suitable for a single-phase motor. Also, a secondary, quadrature winding, when properly located, not only can provide information on the shape and amplitude of the motor back EMF waveform which is identical to the corresponding information provided by the torque-producing primary motor windings, but also can provide the microcomputer controller with information on the angular rotor position of the motor, as noted above.

Figure 3:
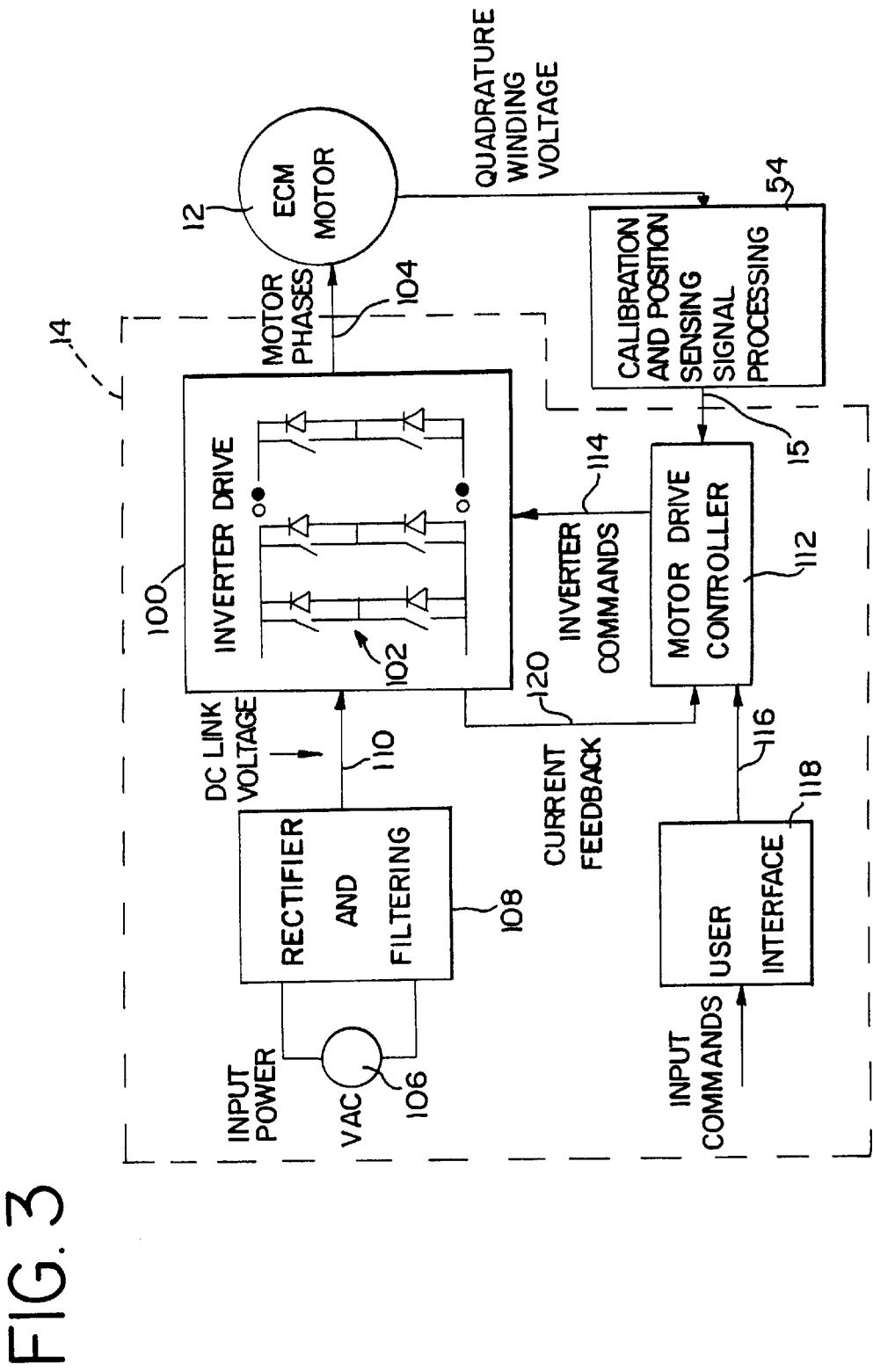
FIG. 3 is a block diagram similar to FIG. 1 with the motor drive thereof illustrated in greater detail.

FIG. 3 illustrates the calibration system of FIG. 1 with one embodiment of the motor drive 14 shown in greater detail. FIG. 3, like FIG. 1, shows the electronically controlled motor 12 and a calibration and position-sensing signal-processing block 54 (corresponding to the calibration apparatus 54 of FIG. 1) coupled to receive a quadrature or other winding voltage from the motor 12. The motor 12 is controlled by the motor drive 14 (appearing outlined in phantom lines in FIG. 3), and the motor drive 14, once again, receives a compensated current command signal 15 from the calibration apparatus 54. The motor drive 14 includes in inverter drive 100 comprising one or more phase legs 102.

The inverter drive 100 provides motor phase signals 104 to the motor 12. Of course, the inverter drive 100 can comprise a half-bridge or a full-bridge, and the number of motor phase signals 104 ordinarily will match the number of phases required by the motor 12. The motor drive 14 also includes an AC voltage source 106, which is rectified and filtered by a block 108 to produce a DC link voltage 110 which supplies input power the inverter drive 100. A motor drive controller 112 provides inverter commands 114 to the inverter drive 100. The motor drive controller 112 receives user input commands 116 via a user interface 118, a current feedback signal 120 comprising the operating current of the motor 12 as sensed in the inverter drive 100, and the compensated current command signal 15 output by the calibration apparatus 54.

What is claimed is:

1. A method of calibrating a motor having a first motor winding that provides a motor back EMF during operation of the motor, wherein the motor is operable by a supply current to develop, at a predetermined nominal rotational speed, a predetermined nominal torque corresponding to a predetermined operating current and a predetermined nominal back EMF, the method comprising the steps of:

applying a supply current to the motor such that the motor operates at a known rotational speed;

disconnecting the supply current from the motor such that the motor decelerates from the known rotational speed;

obtaining an EMF indication of motor back EMF;

comparing the EMF indication with the predetermined nominal back EMF;

developing a supply current adjustment providing for compensation of the supply current based on the EMF indication and the predetermined nominal back EMF such that the motor produces the predetermined nominal amount of torque when operated at the predetermined nominal rotational speed; and storing the supply current adjustment.

2. The method of claim 1, further comprising the step of operating the motor with the supply current and the stored supply current adjustment.

3. The method of claim 1, wherein the obtaining step comprises the step of sensing motor back EMF via the first motor winding while the motor is decelerating and after the operating current has decayed substantially to zero.

4. The method of claim 1, wherein the motor has a second motor winding magnetically coupled with the first winding and wherein the obtaining step comprises the step of sensing motor back EMF via the second motor winding.

5. The method of claim 4, wherein the second motor winding is a quadrature winding with respect to the first motor winding and provides a scalar multiple of the motor back EMF provided by the first motor winding, and wherein the sensing step senses motor back EMF while the motor is powered and operating.

6. The method of claim 1, wherein the supply current adjustment developed by the developing step represents an increase to the supply current if the EMF indication is less than the predetermined nominal back EMF and represents a decrease to the supply current if the EMF indication exceeds the predetermined nominal back EMF.

7. A method of calibrating a motor having a primary motor winding that provides a motor back EMF during operation of the motor and a secondary winding that provides a scalar multiple of the motor back EMF during operation of the motor, wherein the motor is operable by a supply current to develop, at a predetermined nominal rotational speed, a predetermined nominal torque corresponding to a predetermined operating current and a predetermined nominal back EMF, the method comprising the steps of:

operating the motor at a known rotational speed;

obtaining an EMF indication of the magnitude of the motor back EMF via the secondary motor winding while the motor is operating at the known rotational speed;

comparing the EMF indication with the predetermined nominal back EMF;

developing a supply current adjustment providing for compensation of the supply current based on the EMF indication and the predetermined nominal back EMF such that the motor produces the predetermined nominal amount of torque when operated at the predetermined nominal rotational speed; and storing the supply current adjustment.

8. The method of claim 7, further comprising the step of operating the motor with the supply current and the stored supply current adjustment.

9. The method of claim 7, wherein the secondary winding is a quadrature winding with respect to the primary motor winding.

10. The method of claim 7, wherein the supply current adjustment developed by the developing step represents an increase to the supply current if the EMF indication is less than the predetermined nominal back EMF and a decrease to the supply current if the EMF indication exceeds the predetermined nominal back EMF.

11. An apparatus for calibrating a motor having a first motor winding that provides a motor back EMF during operation of the motor, wherein the motor is operable by a supply current to develop, at a predetermined nominal rotational speed, a predetermined nominal torque corresponding to a predetermined operating current and a predetermined nominal back EMF, the apparatus comprising:

a source of supply current connectable to the motor such that the motor operates at a known rotational speed and disconnectable from the motor such that the motor decelerates from the known rotational speed;

an EMF sensing circuit for obtaining an EMF indication of motor back EMF;

a comparator for comparing the EMF indication with the predetermined nominal back EMF;

developing means for developing a supply current adjustment providing for compensation of the supply current based on the EMF indication and the predetermined nominal back EMF such that the motor produces the predetermined nominal amount of torque when operated at the predetermined nominal rotational speed; and a memory for storing the supply current adjustment.

12. The apparatus of claim 11, wherein the EMF sensing circuit senses motor back EMF via the first motor winding.

13. The apparatus of claim 11, wherein the motor has a second motor winding magnetically coupled with the first winding and wherein the EMF sensing circuit senses motor back EMF via the second motor winding.

14. The apparatus of claim 13, wherein the second motor winding is a quadrature winding with respect to the first motor winding and provides a scalar multiple of the motor back EMF provided by the first motor winding, and wherein the EMF sensing circuit senses motor back EMF while the motor is powered and operating.

15. The apparatus of claim 11, wherein the supply current adjustment developed by the developing means represents an increase to the supply current if the EMF indication is less than the predetermined nominal back EMF and represents a decrease to the supply current if the EMF indication exceeds the predetermined nominal back EMF.

16. An apparatus for calibrating a motor having a primary motor winding that provides a motor back EMF during operation of the motor and a secondary winding that provides a scalar multiple of the motor back EMF during operation of the motor, wherein the motor is operable by a supply current to develop, at a predetermined nominal rotational speed, a predetermined nominal torque corresponding to a predetermined operating current and a predetermined nominal back EMF, the apparatus comprising:

means for operating the motor at a known rotational speed;

an EMF sensing circuit for obtaining an EMF indication of the magnitude of the motor back EMF via the secondary motor winding while the motor is operating at the known rotational speed;

a comparator for comparing the EMF indication with the predetermined nominal back EMF;

means for developing a supply current adjustment providing for compensation of the supply current based on the EMF indication and the predetermined nominal back EMF such that the motor produces the predetermined nominal amount of torque when operated at the predetermined nominal rotational speed; and a memory for storing the supply current adjustment.

17. The apparatus of claim 16, wherein the supply current adjustment developed by the developing means represents an increase to the supply current if the EMF indication is less than the predetermined nominal back EMF and a decrease to the supply current if the EMF indication exceeds the predetermined nominal back EMF.

18. A method of calibrating a motor having a first motor winding that provides a motor back EMF during operation of the motor, wherein the motor is operable by a supply current to develop, at a predetermined nominal rotational speed, a predetermined nominal amount of torque corresponding to a predetermined operating current and a predetermined nominal back EMF, the method comprising the step of developing a supply current adjustment that provides for compensation of the supply current based on an EMF indication of motor back EMF and the predetermined nominal back EMF such that the motor produces the predetermined nominal amount of torque when operated at the predetermined nominal rotational speed.

19. The method of claim 18, further comprising the step of storing the supply current adjustment.

20. The method of claim 19, further comprising the step of operating the motor with the supply current and the stored supply current adjustment.

21. The method of claim 18 further comprising the step of sensing motor back EMF via the first motor winding while the motor is decelerating and the operating current is substantially zero.

22. The method of claim 18, wherein the motor has a second motor winding magnetically coupled with the first winding and further comprising the step of sensing motor back EMF via the second motor winding.

23. The method of claim 22, wherein the second motor winding is a quadrature winding with respect to the first motor winding and provides a scalar multiple of the motor back EMF provided by the first motor winding, and wherein the sensing step senses motor back EMF while the motor is powered and operating.

24. The method of claim 18, further comprising the steps of:

applying a supply current to the motor such that the motor operates at a known rotational speed;

disconnecting the supply current from the motor such that the motor decelerates from the known rotational speed; and obtaining the EMF indication of motor back EMF.

* * * * *